Feb. 3, 1925.
M. ROECKNER
PIPE JOINT
Filed March 11, 1924
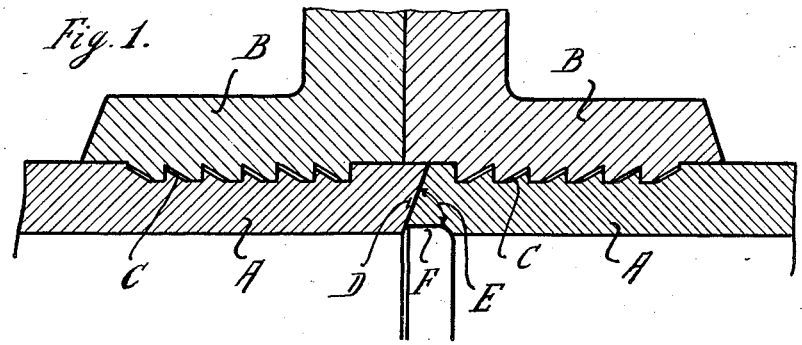
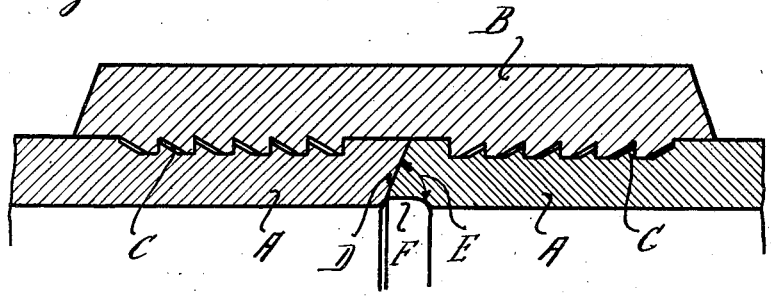
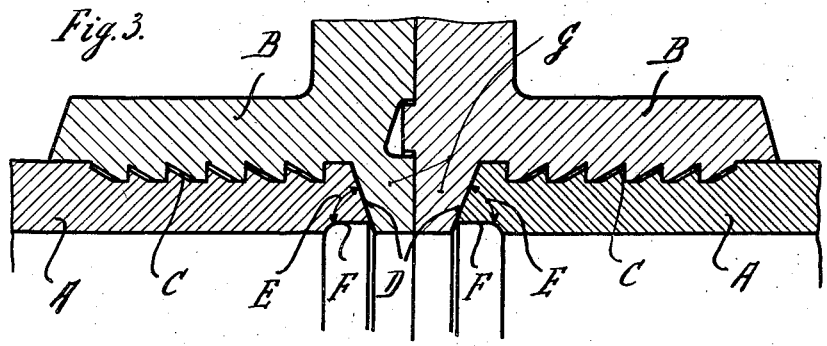
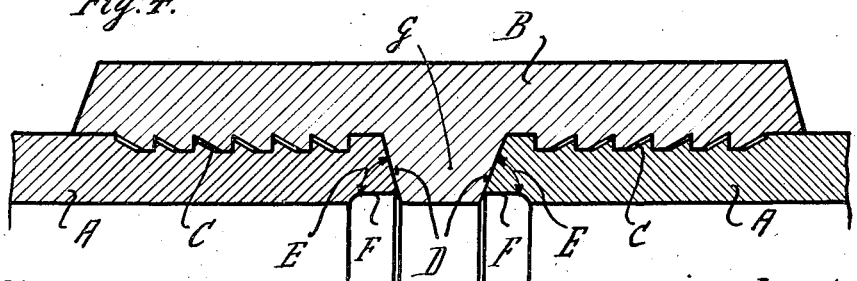

Patented Feb. 3, 1925.

1,525,414

UNITED STATES PATENT OFFICE.

MARTIN ROECKNER, OF MULHEIM-RUHR, GERMANY.

PIPE JOINT.

Application filed March 11, 1924. Serial No. 698,407.

*To all whom it may concern:*

Be it known that I, MARTIN ROECKNER, a German citizen, and residing at Mulheim-Ruhr, Germany, have invented certain new and useful Improvements in Pipe Joints (for which I have made application for patent in Germany, filed 7th March, 1923, No. R. 57,981), of which the following is a specification.

It is known to form joints of members to be joined by pressing said members into or onto one another with the aid of screw-threads, the tightening between said members being effected by means of turned tightening planes thereon or by inserting separate tightenings between said members.

According to the present invention, said tightening in pipe joints is effected by caulking the joint formed at the specially turned butt ends of the pipes to be joined; as this is already known in connection with riveted seams of boilers and the like. To permit such caulking at the two joined members, it is necessary that the face to be caulked of one member forms an angle (caulking angle) relatively to the upper surface of the other member, which angle permits the caulking tool being applied (see angle E hereinafter), and that besides the edge to be caulked of the first mentioned member lies at such a distance from the edge of the last mentioned member (see recess F hereinafter) that a reliable removal of the burr formed by said caulking is possible.

The present invention provides thus an improved pipe joint for pipes of equal diameter with the aid of riveted or shrunk joining members, which is distinguished from the known art by the butt ends of the pipes to be joined being turned in inclined fashion with reference to the pipe axis while the pipe end adjoining the acute angle formed by such turning receives furthermore a recess whereby a butt joint is provided at which an inclination equal to the caulking angle exists between two faces.

The improved pipe joint is shown by four appropriate constructional forms in Figs. 1 to 4 inclusive of the accompanying drawing, each figure showing one half of the joint in a longitudinal central section.

The improved joint allows to so connect the pipes A, A to be joined that the tensile strains only occurring in the pipe wall in parallel direction to the pipe axis are to be taken up by the toothing C and to be transmitted to the joining members B, while the oppositely directed compressive strains do not influence the toothing C. At the same time, a skilled caulking of the existing joint is made possible by the butt ends D of the pipes being turned in inclined fashion with reference to the pipe axis while the pipe end adjoining the acute angle formed by such turning receives furthermore a recess F, whereby a butt joint is provided at which an inclination equal to the caulking angle E exists between two faces.

In the illustrations, the inclined turning of the butt ends of the pipes is assumed to be equal to the caulking angle E, so that the recess F runs parallel to the pipe axis. The inclination of said butt ends may, however, be made at another angle, in which case the recess F would not run parallel to the pipe axis.

As shown in Figs. 1 and 2, the butt ends D of the pipes may bear directly upon one another, though they may also make contact with corrosponding projections G of the joining members, as shown in Figs. 3 and 4. In the former case, one recess F only will suffice for the purpose in question, while in the latter case, correspondingly, two such recesses F are required, as shown by the illustrations.

Obviously, the essence of the invention applies also to such pipe joints in which, instead of external as shown, internal joining members are used, or in which the toothing shown is replaced by a riveting or other fastening means, this being obvious without further illustrations.

What I claim, is:—

1. In a caulked pipe joint for pipes of equal diameter with the aid of fixed joining members, the combination of butt ends on said pipes turned in inclined fashion with reference to the pipe axis, and a recessed portion on the pipe end adjoining the acute angle formed by such turning and adapted to provide a butt joint at which an inclination equal to the caulking angle exists between two faces, substantially as set forth.

2. In a caulked pipe joint for pipes of equal diameter with the aid of fixed joining members, the combination of butt ends on said pipes bearing directly upon one another and turned in inclined fashion with reference to the pipe axis, and a recessed portion on the pipe end adjoining the acute angle formed by such turning and adapted to provide a butt joint at which an inclination equal to the caulking angle exists between two faces, substantially as set forth.

3. In a caulked joint for pipes of equal diameter with the aid of fixed joining members, butt ends on said pipes turned in inclined fashion with reference to the pipe axis, corresponding projections on said joining members in contact with said inclined pipe butt ends, and a recessed portion on the pipe end adjoining the acute angle formed by such turning and adapted to provide a butt joint at which an inclination equal to the caulking angle exists between two faces, substantially as set forth.

In testimony whereof I have hereunto set my hand in the presence of two subscribing witnesses.

MARTIN ROECKNER.

Witnesses:
   REICHENBECHER,
   STREVER.